(12) United States Patent
Park et al.

(10) Patent No.: US 9,360,621 B1
(45) Date of Patent: Jun. 7, 2016

(54) FLAT-TOP MODE GENERATING DEVICE AND ARRAYED WAVEGUIDE GRATING HAVING THE SAME

(71) Applicant: ELECTRONICS AND TELECOMMUNICATIONS RESEARCH INSTITUTE, Daejeon (KR)

(72) Inventors: Jaegyu Park, Daejeon (KR); Myungjoon Kwack, Gimpo (KR); Gyungock Kim, Daejeon (KR); Jiho Joo, Daejeon (KR)

(73) Assignee: ELECTRONICS AND TELECOMMUNCATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/819,752

(22) Filed: Aug. 6, 2015

(30) Foreign Application Priority Data

Jan. 27, 2015 (KR) .................. 10-2015-0012809

(51) Int. Cl.
| | |
|---|---|
| G02B 6/26 | (2006.01) |
| G02B 6/10 | (2006.01) |
| G02B 6/12 | (2006.01) |
| G02B 6/122 | (2006.01) |
| G02B 6/125 | (2006.01) |
| G02B 6/293 | (2006.01) |
| G02B 6/14 | (2006.01) |

(52) U.S. Cl.
CPC ............ *G02B 6/12014* (2013.01); *G02B 6/125* (2013.01); *G02B 6/12016* (2013.01); *G02B 6/12026* (2013.01); *G02B 6/1228* (2013.01); *G02B 6/14* (2013.01); *G02B 6/2938* (2013.01)

(58) Field of Classification Search
None
See application file for complete search history.

(56) References Cited

U.S. PATENT DOCUMENTS

| | | | |
|---|---|---|---|
| 5,887,103 A | 3/1999 | Jeong et al. | |
| 6,921,490 B1* | 7/2005 | Qian | G02B 6/12011 216/24 |
| 7,400,800 B2 | 7/2008 | Kitoh et al. | |
| 2002/0159703 A1* | 10/2002 | McGreer | G02B 6/12004 385/43 |
| 2004/0120674 A1* | 6/2004 | So | G02B 6/1228 385/129 |
| 2009/0016679 A1 | 1/2009 | Das et al. | |
| 2009/0154928 A1 | 6/2009 | Shin et al. | |

OTHER PUBLICATIONS

Pathak et al., "Optimized Silicon AWG With Flattened Spectral Response Using an MMI Aperture", Journal of Lightwave Technology, Jan. 1, 2013, pp. 87-93, vol. 31, No. 1, IEEE.

* cited by examiner

*Primary Examiner* — Hemang Sanghavi (57) ABSTRACT

Provided is a flat-top mode generating device. The flat-top mode generating device includes an input waveguide, a double-tapered structure connected to the input waveguide, and an input star coupler connected to the double-tapered structure. The double-tapered structure includes a first part having a first height hat is equal to that of each of the input waveguide and the input star coupler, and a second part disposed in the first part on the plane and having a second height that is less than the first height, the second part being tapered from the input star coupler toward the input waveguide.

18 Claims, 9 Drawing Sheets

FLAT-TOP MODE GENERATING DEVICE AND ARRAYED WAVEGUIDE GRATING HAVING THE SAME

CROSS-REFERENCE TO RELATED APPLICATIONS

This U.S. non-provisional patent application claims priority under 35 U.S.C. §119 of Korean Patent Application No. 10-2015-0012809, filed on Jan. 27, 2015, the entire contents of which are hereby incorporated by reference.

BACKGROUND

The present disclosure herein relates to a flat-top mode generating device and an arrayed waveguide grating having the same, and more particularly, to a flat-top mode generating device having a double-tapered structure and an arrayed waveguide grating having the same.

Currently, in optical communication fields and photonic integrated circuit (PIC) fields, optical devices for muxing-demuxing signals may include arrayed waveguide gratings (AWGs), echelle gratings, ring filters, and mach-zehnder interferometer. Among these devices, the AWGs are the most widely used wavelength division multiplexer (WDM) devices. In the AWG field, studies on silica-based AWGs and AWGs based on silicon (Si) or indium phosphide (InP), which is a material having a greater refractive index than that of the silica, are being conducted.

When a material having a relatively great refractive index is used, the radius of curvature at which optical loss is minimized is reduced. Thus, the AWG device may decrease in size. A general AWG has an input loss of about 3 dB. Since a silicon AWG has a relatively high thermal expansion coefficient, an output spectrum of the AWG is sensitive to a temperature. Thus, when the silicon AWG is applied, it is necessary to design the AWG so that the silicon AWG operates regardless of the temperature. For this, it is common to design the AWG so that the output spectrum of the AWG is flatted to maintain a uniform output even though the spectrum changes in wavelength due to the change of the temperature.

SUMMARY

The present disclosure provides a flat-top mode generating device outputting light with a flat-top mode and an arrayed waveguide grating having the same.

An embodiment of the inventive concept provides a flat-top mode generating device including: an input waveguide; a double-tapered structure connected to the input waveguide; and an input star coupler connected to the double-tapered structure, wherein the double-tapered structure includes: a first part having a first height that is equal to that of each of the input waveguide and the input star coupler; and a second part disposed in the first part on the plane and having a second height that is less than the first height, the second part being tapered from the input star coupler toward the input waveguide.

In an embodiment, the first part may have an effective refractive index that is greater than that of the second part.

In an embodiment, the second part may have a trapezoidal shape on the plane.

In an embodiment, the second part may have a triangular part on the plane.

In an embodiment, the second part may have a rounded edge that is adjacent to the input waveguide on the plane.

In an embodiment, the second part may have an uneven structure or saw-tooth-shaped portion which is adjacent to the input star coupler on the plane.

In an embodiment, the first part may have a height of about 220 nm, and a portion of the second part, which is adjacent to the input star coupler, may have width of about 30% to about 60% of the width of the first part.

In an embodiment, the first part may have a height of about 220 nm, and the second part may have a height that is less by about 10 nm to about 50 nm than that of the first part.

In an embodiment, the second part may have a length of about 15 nm or more.

In an embodiment, the first part may be tapered from the input star coupler toward the input waveguide on the plane.

In an embodiment, the flat-top mode generating device may further include a clad layer configured to cover the input waveguide, the double-tapered structure, and the input star coupler.

In an embodiments of the inventive concept, an arrayed waveguide grating includes: an input star coupler; a double-tapered structure connected to the input waveguide, the double-tapered structure being disposed on one end of the input star coupler; an output star coupler disposed adjacent to the input star coupler; and an arrayed waveguide structure including a plurality of arrayed waveguides configured to connect the output star coupler to the input star coupler, wherein the double-tapered structure includes: a first part having a first height that is equal to that of each of the input waveguide and the input star coupler; and a second part disposed in the first part on the plane and having a second height that is less than the first height, the second part being tapered from the input star coupler toward the input waveguide.

In an embodiment, the double-tapered structure may include: a first region adjacent to the input waveguide; and a second region adjacent to the input star coupler.

In an embodiment, the second part may have a linear edge in the first region on the plane.

In an embodiment, the second part may have a rounded edge in the first region on the plane.

In an embodiment, the second part may be tapered so that the second part has one vertex in the first region on the plane.

In an embodiment, the second part may have a linear uneven edge or saw-tooth-shaped edge in the second region.

In an embodiment, the first part may have a height of about 220 nm, and the second part may have a height that is less by about 10 nm to about 50 nm than that of the first part.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched area illustrated as a right angle may be rounded or a shape having a predetermined curvature. Areas exemplified in the drawings have general properties, and are used to illustrate a specific shape of a semiconductor package region. Thus, this should not be construed as limited to the scope of the present invention.

Figure 1:
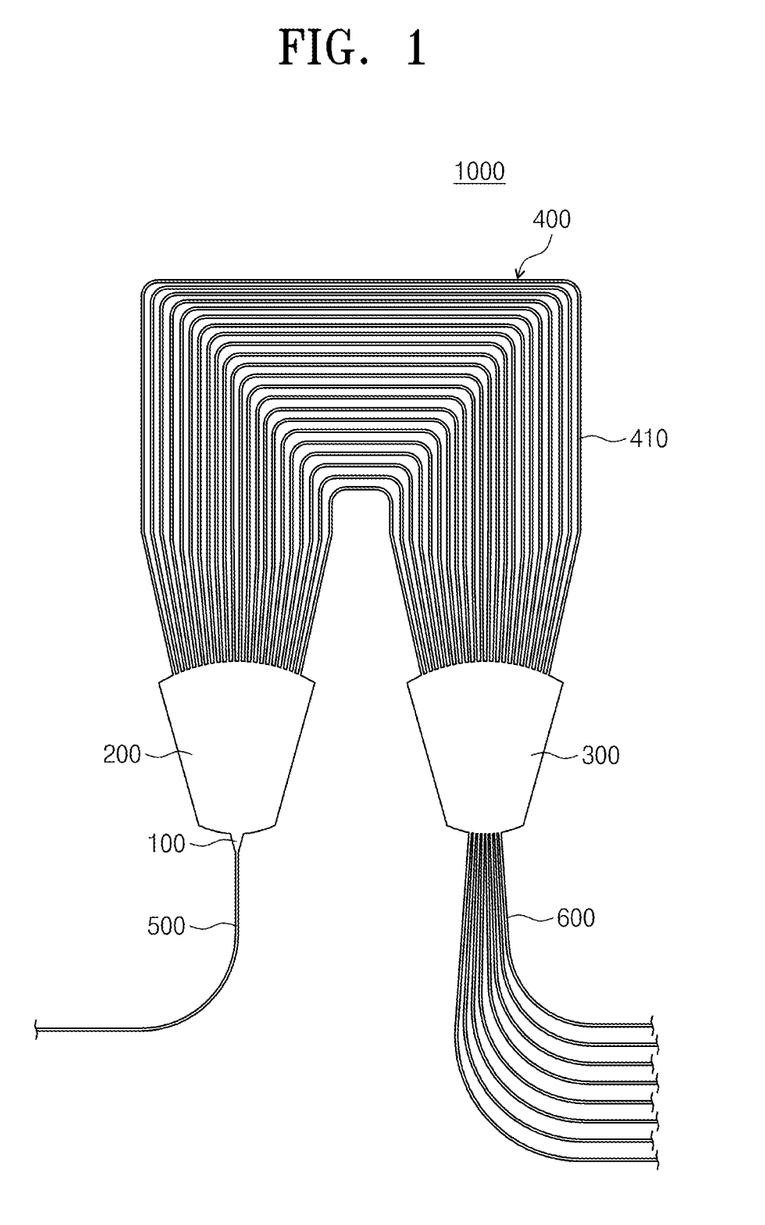
FIG. 1 is a plan view of an arrayed waveguide grating according to an embodiment of the inventive concept.
Figure 2:
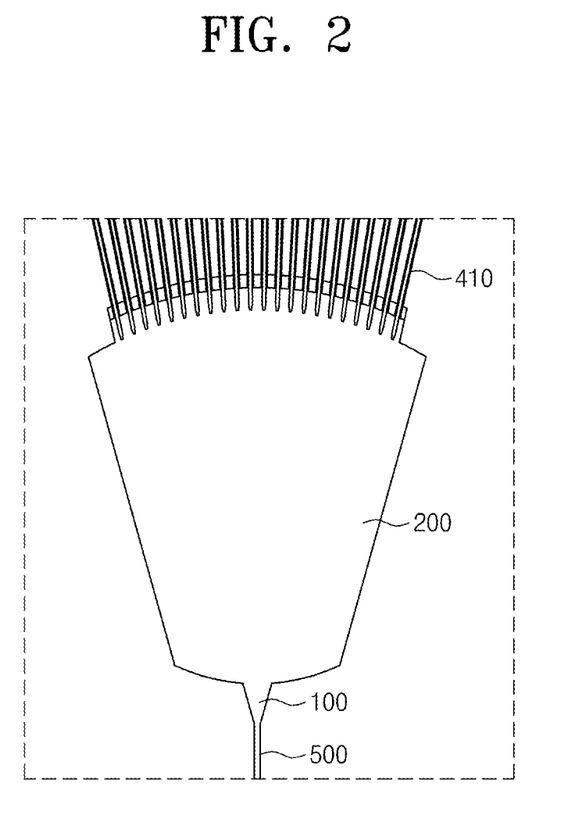
FIG. 2 is a plan view illustrating an input star coupler and an arrayed waveguide structure of the arrayed waveguide grating of FIG. 1.

FIG. 1 is a plan view of an arrayed waveguide grating according to an embodiment of the inventive concept, and FIG. 2 is a plan view illustrating an input star coupler and an arrayed waveguide structure of the arrayed waveguide grating of FIG. 1.

Referring to FIGS. 1 and 2, an arrayed waveguide grating 1000 may include a double-tapered structure 100, an input star coupler 200, an arrayed waveguide structure 400, and an output star coupler 300.

The double-tapered structure 100 may be disposed between an input waveguide 500 and the input star coupler 200. The double-tapered structure 100 may have a triangle shape. For example, the double-tapered structure 100 may be formed of silicon (Si). When Gaussian-shaped light is inputted, the double-tapered structure 100 may convert the light into flat-top light.

The input star coupler 200 may be disposed between the double-tapered structure 100 and the arrayed waveguide structure 400. The input star coupler 200 may be disposed adjacent to the output star coupler 300. The input star coupler 200 may be disposed on one end of the arrayed waveguide structure 400, and the output star coupler 300 may be disposed on the other end of the arrayed waveguide structure 400. The input star coupler 200 may provide the light to the arrayed waveguide structure 400.

The arrayed waveguide structure 400 may include a plurality of arrayed waveguides 410. The arrayed waveguides 410 may have lengths different from each other. The arrayed waveguides 410 may be connected between the input star coupler 200 and the output star coupler 300. Each of the arrayed waveguides 410 may be bent. For example, the arrayed waveguide 410 may be bent in a "U" shape. A length difference may occur between the arrayed waveguides 410. The arrayed waveguide structure 400 may act as a diffraction grating. Thus, light signals outputted from the arrayed waveguides 410 may be focused to positions different from each other depending on wavelengths thereof.

The input waveguide 500 may provide the light to the input star coupler 200. The output star coupler 300 may have one end that is connected to the arrayed waveguides 410 and the other end that is connected to output waveguides 600. The output star coupler 300 may demultiplex the light signals according to the wavelengths to output the demultiplexed light signals to the output waveguides 600. When light signals having various wavelengths are inputted into the output waveguides 600, a light signal having a multiplexed wavelength may be outputted from the input waveguide 500. In this case, the arrayed waveguide grating 1000 may be used to multiplex and demultiplex the wavelength.

Figure 3:
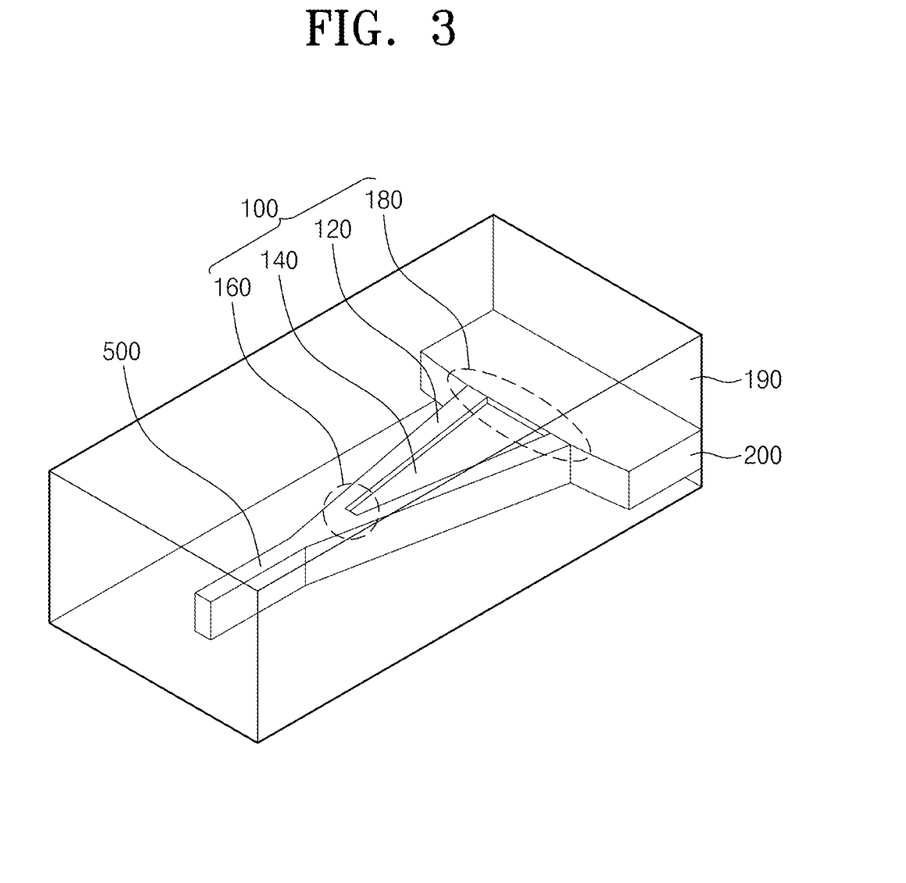
FIG. 3 is a perspective view of a double-tapered structure according to an embodiment of the inventive concept.
Figure 4:
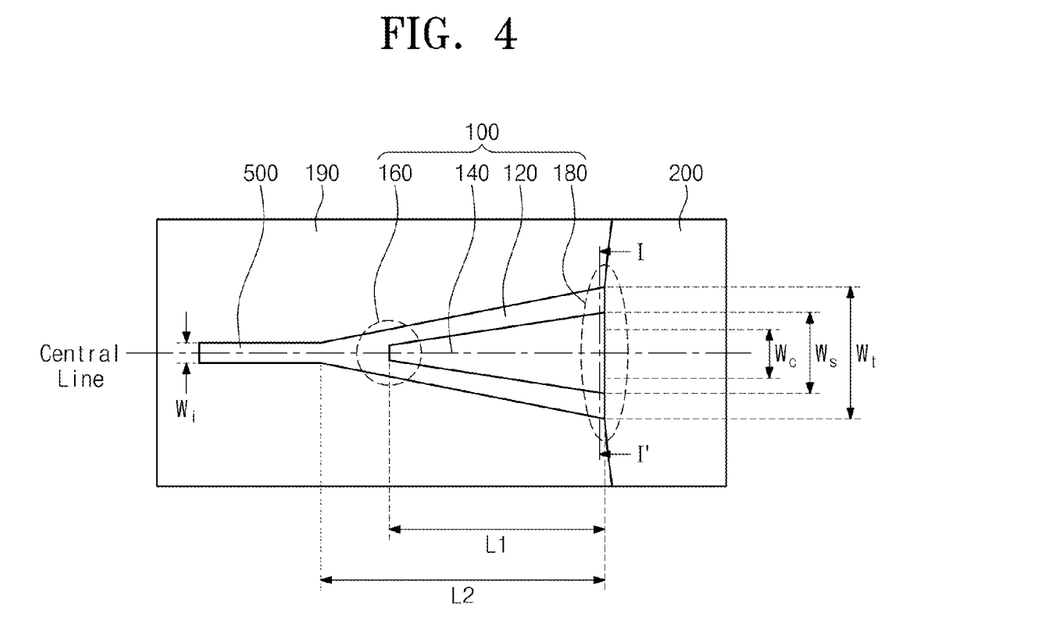
FIG. 4 is a plan view of the double-tapered structure of FIG. 3.
Figure 5:
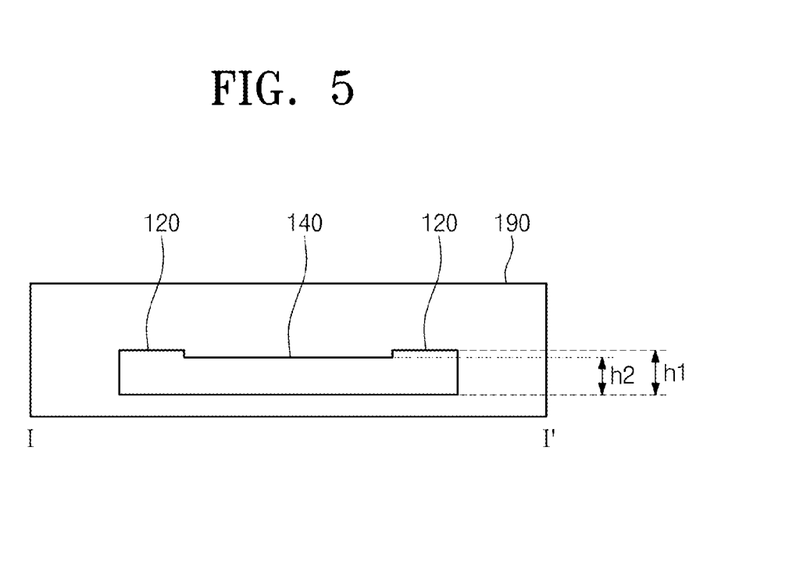
FIG. 5 is a cross-sectional view of the double-tapered structure of FIG. 3.
Figure 6:
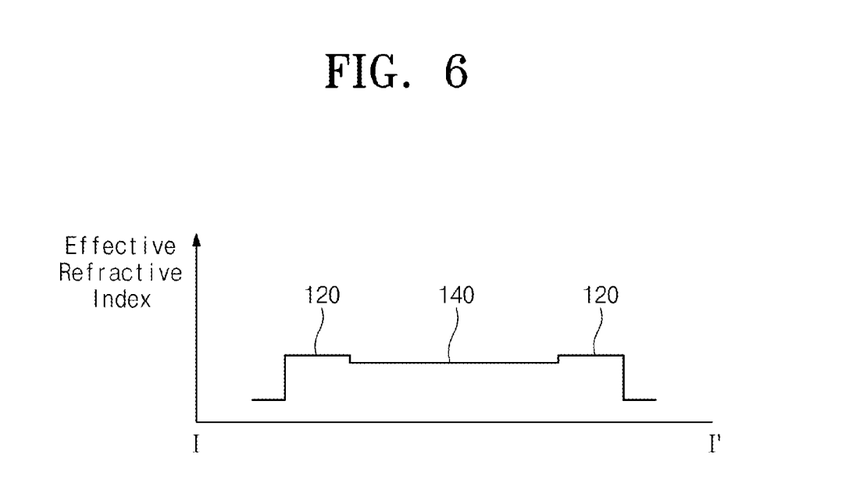
FIG. 6 is a graph illustrating an effective refractive index of the double-tapered structure.
Figure 7:
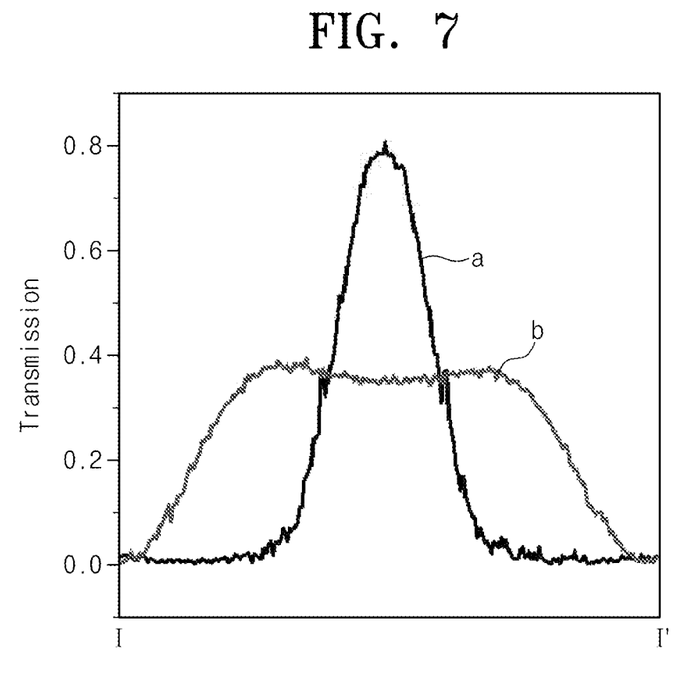
FIG. 7 is a graph illustrating a mode variation of incident light in the double-tapered structure.

FIG. 3 is a perspective view of a double-tapered structure according to an embodiment of the inventive concept, and FIG. 4 is a plan view of the double-tapered structure of FIG. 3. Also, FIG. 5 is a cross-sectional view of the double-tapered structure of FIG. 3, and FIG. 6 is a graph illustrating an effective refractive index of the double-tapered structure. Also, FIG. 7 is a graph illustrating a mode variation of incident light in the double-tapered structure. In FIG. 7, x-axis represents a section of the double-tapered structure 100 taken along line I-I' of FIG. 4, and y-axis represents transmissivity of light.

Referring to FIGS. 3 to 5, the double-tapered structure 100 may include a first part 120 and a second part 140. The first part 120 may have one end that is connected to the input waveguide 500. The first part 120 may have the other end that is connected to the input star coupler 200. The first part 120 may have the same first height h1 as that of the input waveguide 500. The first part 120 may be tapered from the input star coupler 200 toward the input waveguide 500.

The second part 140 may be disposed in the first part 120. The second part 140 may have a second height h2 that is less than the first height h1. The second part 140 may be tapered from the input star coupler 200 toward the input waveguide 500.

Referring to FIG. 6, since the second part 140 has the height that is less than that of the first part 120, the second section part 140 may have an effective refractive index that is less than that of the first part 120. Thus, when the light is incident into the double-tapered structure 100, the light may spread to the first part 120 having a relatively high effective refractive index. As illustrated in FIG. 7, incident light with a Gaussian mode (a) may be converted into light with a flat-top mode (b). Therefore, the double-tapered structure 100 may output light having uniform intensity in a predetermined range of the waveguide.

Referring again to FIGS. 3 and 5, in the current embodiment, the double-tapered structure 100 may be formed of silicon (Si), and the first part 120 may have the height h1 of about 220 nm. The inside of the tapered first part 120 may be etched in a tapered shape to form the second part 140. Here, an etched depth (that is, h1−h2) may be less than about 10 nm to about 50 nm. Generally, an etched depth (that is, h1−h2) may be less than 20% of the first part 120(h1). To minimize a phenomenon in which the light is scattered by the etched tapered structure while the light progresses, the etched depth may be provided as thin as possible.

The double-tapered structure 100 may have a first region 160 and a second region 180. The first region 160 may be disposed adjacent to the input waveguide 500, and the second region may be disposed adjacent to the input star coupler 200. The second region 120 may have a trapezoidal shape. A portion, which is adjacent to the input waveguide, of the second region 120 may have a linear edge. The second region 120 may be tapered from the second region 180 toward the first region 160.

A clad layer 190 for covering upper and lower portions of the double-tapered structure 100 may be provided. The clad layer 190 may have a refractive index that is less than that of the double-tapered structure 100. For example, the clad layer 190 may be a silicon oxide film (SiO2).

Figure 8:
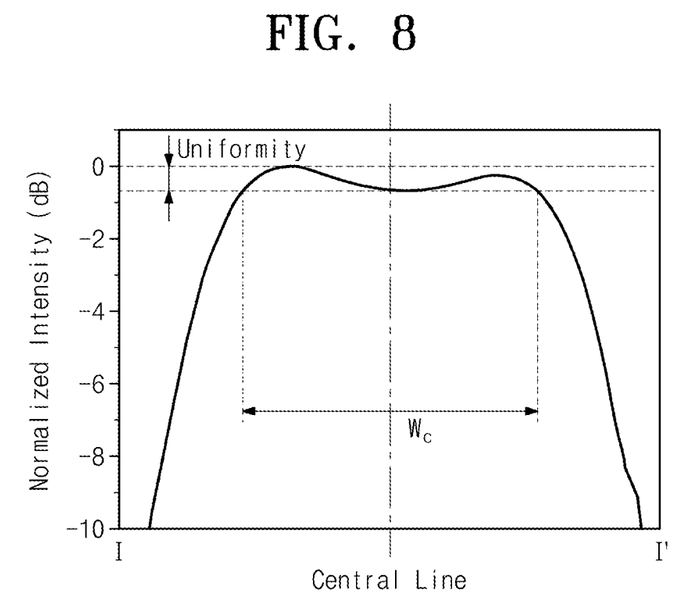
FIG. 8 is a graph of a flat-top mode according to an embodiment.
Figure 9:
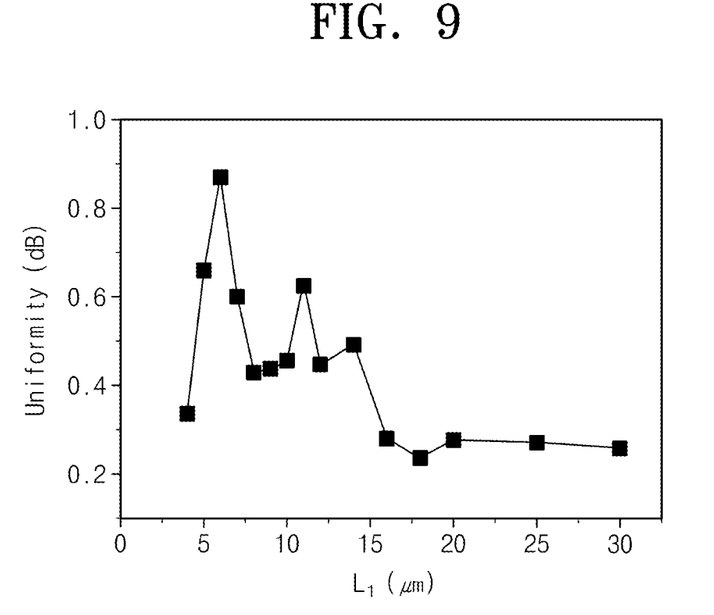
FIG. 9 is a graph illustrating uniformity of the flat-top mode of FIG. 8.

FIG. 8 is a graph of a flat-top mode according to an embodiment, and FIG. 9 is a graph illustrating uniformity of the flat-top mode of FIG. 8.

To determine uniformity of the flat-top mode, the intensity variation of the light outputted from a width Wc of about 1 μm of a central portion of the double-tapered structure (see reference numeral 100 of FIG. 4) is observed. The width Wc represents a width of about 0.5 μm at each of left and right sides from a central line of the double-tapered structure (see reference numeral 100 of FIG. 4). The length of the second part 140 is defined as L1, and the length of the first part 120 is defined as L2. Here, the intensity variation of the light outputted from the double-tapered structure 100 is observed while changing the length L1. The length L2 is longer by about 2 μm than the length L1. The height h1 of the double-tapered structure 100 is about 220 nm. Also, the input waveguide 500 has a width Wi of about 0.5 μm, and the first part 120 in the second region 180 has a width Wt of about 2.2 μm. Here, the second part 140 may have the height (that is h1−h2) that is less by about 20 nanometers than that of the first part 120.

Referring to FIG. 9, when the length L1 is about 15 μm or more, the flat-top mode may have uniformity. When the length L1 is about 150 μm or more, a difference between the maximum value and the minimum value of the intensity of the outputted light may be less than about 0.3 dB.

Figure 10:
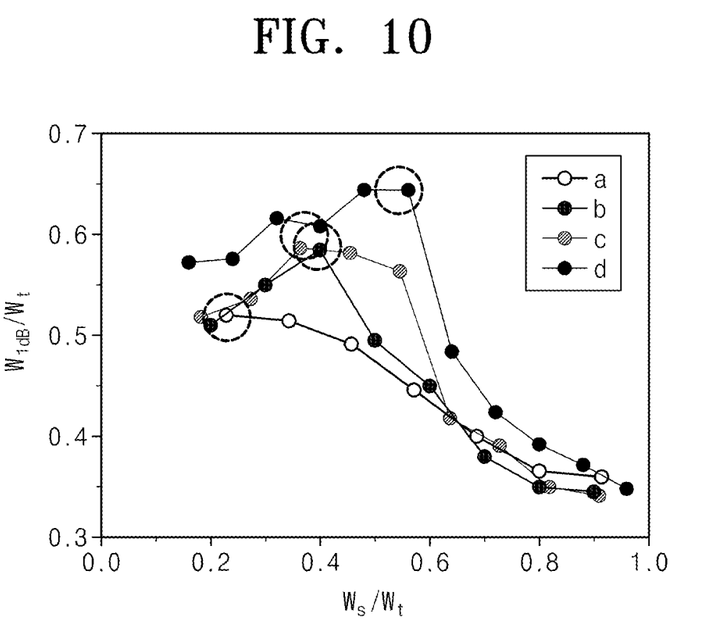
FIGS. 10 and 11 are graphs of a flat-top mode according to another embodiment of the inventive concept.
Figure 11:
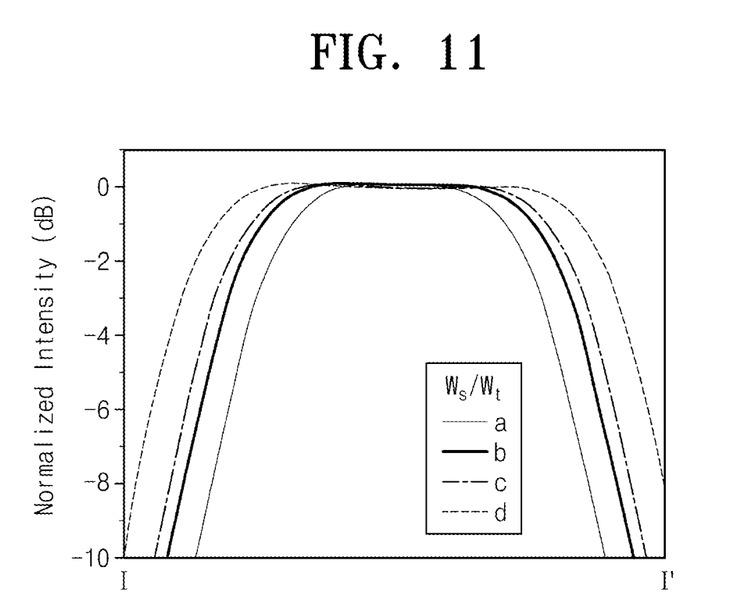

FIGS. 10 and 11 are graphs of a flat-top mode according to another embodiment of the inventive concept.

Referring to FIGS. 10 and 4, the outputted flat-top mode is observed while fixing the length L1 is fixed to about 18 μm and changing the width Wt of the first part 120 and a width Ws of the second part 140 in the second region 180. The width of the first part 120 in the second region 180 may be defined as Wt, and the width of the second part 140 in the second region 180 may be defined as Ws. Reference symbol W1dB represents a width of a region in which a difference between the maximum value and the minimum value of the intensity of the light outputted from the double-tapered structure 100 has uniformity as about 1 dB. The double-tapered structure 100 is formed of silicon (Si). The height h1 of the first part 120 is about 220 nm, and the width Wi of the input waveguide 500 is about 0.5 μm. Also, the second part 140 has a height (that is, h1−h2) that is less by about 20 nanometers than that of the first part 120.

When the width Wt is about 1.75 μm, about 2.0 μm, about 2.2 μm, and about 2.5 μm, a condition in which the width W1dB is maximized is measured while changing the width Ws. It is seen that Ws in which the width W1dB is maximized is ~0.6 μm with 1.75 μm Wt, ~0.8 μm with 2.0 μm Wt, ~0.8 μm with 2.2 μm Wt, and ~1.2 μm with 2.5 μm Wt. (each of which is represented as a, b, c, and d in order). That is, the width Ws may be about 30% to about 50% of the width Wt. When the section I-I' of the double-tapered structure 100 and the intensity (dB) of the light are represented with the Ws and Wt values at which the W1dB is maximized as a graph, the flat-top mode is shown as illustrated in FIG. 11. Thus, it can be seen that, in the double-tapered structure 100, there is the Ws value at which the optimum flat-top mode is obtained with respect to each of the Wt values.

Figure 12:
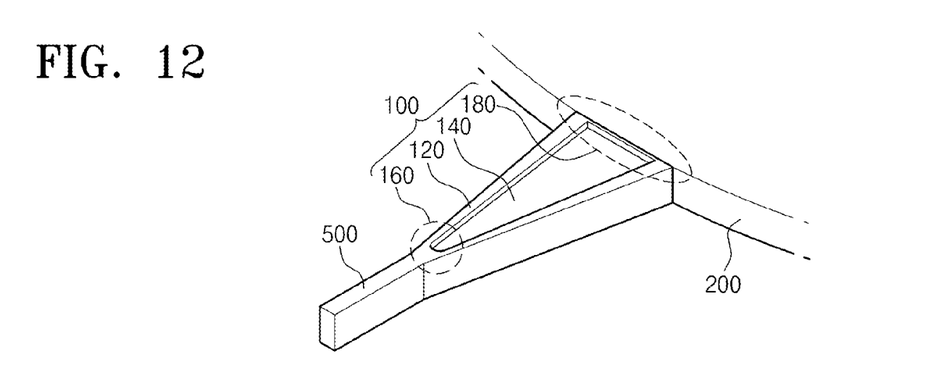
FIGS. 12 to 14 are perspective views of a double-tapered structure according to another embodiment of the inventive concept.
Figure 13:
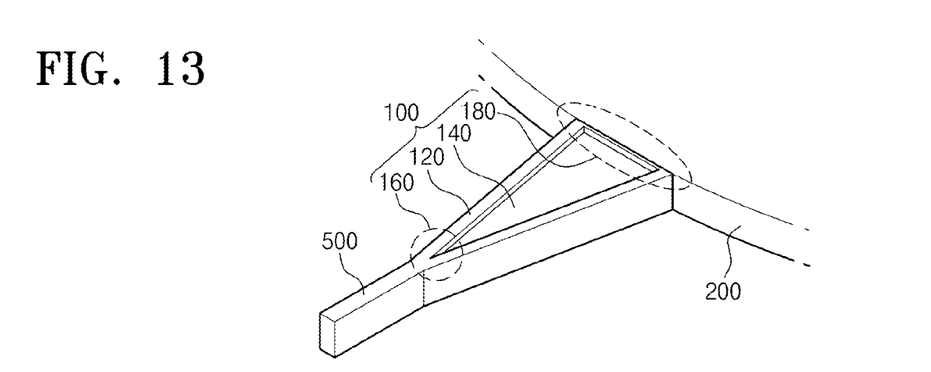
Figure 14:
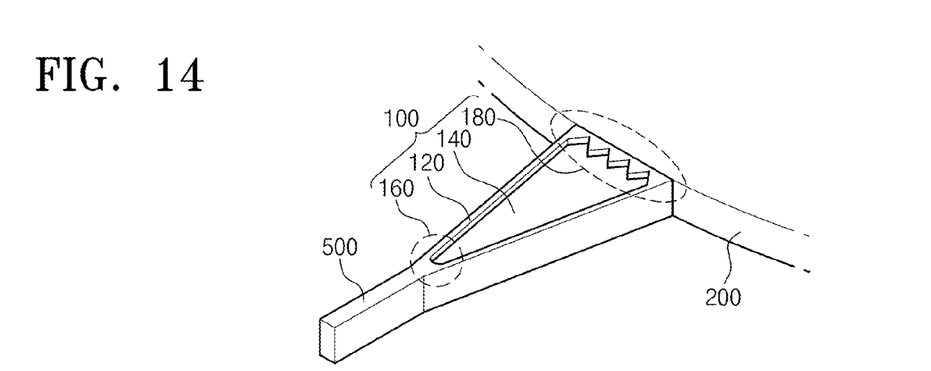

FIGS. 12 to 14 are perspective views of a double-tapered structure according to another embodiment of the inventive concept.

Referring to FIG. 12, the second part 140 may have a rounded edge in the first region 160 on a plane. That is, in the second region 180, the second part 140 may have a linear side contacting the input star coupler 200. Referring to FIG. 13, the second part 140 may be tapered in the first region 160 on the plane so that the second part 140 has one vertext. In the second region 180, the second part 140 may have a linear side contacting the input star coupler 200. An entire second part 140 may have a triangular shape. Referring to FIG. 14, the second part 140 may have an uneven edge or a saw-tooth-shaped edge in the second region 180 on the plane.

Unlike the above description, when the second part 140 extending from the second region 180 to the first region 160 has a tapered shape, the second part 140 may not be limited to the shape thereof in the first and second regions 160 and 180.

According to the embodiments of the inventive concept, the light with the Gaussian mode passing through the double-tapered structure may be converted into the light with the flat-top mode.

According to the embodiments of the inventive concept, the double-tapered structure may be thinly etched to minimize the scattering of the light passing through the double-tapered structure.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A flat-top mode generating device comprising:
    an input waveguide;
    a double-tapered structure connected to the input waveguide; and
    an input star coupler connected to the double-tapered structure,
    wherein the double-tapered structure comprises:
    a first part having a first height that is equal to that of each of the input waveguide and the input star coupler; and
    a second part disposed in the first part on the plane and having a second height that is less than the first height, the second part being tapered from the input star coupler toward the input waveguide.

2. The flat-top mode generating device of claim 1, wherein the first part has an effective refractive index that is greater than that of the second part.

3. The flat-top mode generating device of claim 1, wherein the second part has a trapezoidal shape on the plane.

4. The flat-top mode generating device of claim 1, wherein the second part has a triangular part on the plane.

5. The flat-top mode generating device of claim 1, wherein the second part has a rounded edge that is adjacent to the input waveguide on the plane.

6. The flat-top mode generating device of claim 1, wherein the second part has an uneven structure or saw-tooth-shaped portion which is adjacent to the input star coupler on the plane.

7. The flat-top mode generating device of claim 3, wherein the first part has a height of about 220 nm, and
a portion of the second part, which is adjacent to the input star coupler, has a width of about 30% to about 60% of the width of the first part.

8. The flat-top mode generating device of claim 1, wherein the first part has a height of about 220 nm, and
the second part has a height that is less by about 10 nm to about 50 nm than that of the first part.

9. The flat-top mode generating device of claim 8, wherein the second part has a length of about 15 nm or more.

10. The flat-top mode generating device of claim 1, wherein the first part is tapered from the input star coupler toward the input waveguide on the plane.

11. The flat-top mode generating device of claim 1, further comprising a clad layer configured to cover the input waveguide, the double-tapered structure, and the input star coupler.

12. An arrayed waveguide grating comprising:
an input star coupler;
a double-tapered structure connected to the input waveguide, the double-tapered structure being disposed on one end of the input star coupler;
an output star coupler disposed adjacent to the input star coupler; and
an arrayed waveguide structure comprising a plurality of arrayed waveguides configured to connect the output star coupler to the input star coupler,
wherein the double-tapered structure comprises:
a first part having a first height that is equal to that of each of the input waveguide and the input star coupler; and
a second part disposed in the first part on the plane and having a second height that is less than the first height, the second part being tapered from the input star coupler toward the input waveguide.

13. The arrayed waveguide grating of claim 12, wherein the double-tapered structure comprises:
a first region adjacent to the input waveguide; and
a second region adjacent to the input star coupler.

14. The arrayed waveguide grating of claim 13, wherein, the second part has a linear edge in the first region on the plane.

15. The arrayed waveguide grating of claim 13, wherein, the second part has a rounded edge in the first region on the plane.

16. The arrayed waveguide grating of claim 13, wherein the second part is tapered so that the second part has one vertext in the first region on the plane.

17. The arrayed waveguide grating of claim 13, wherein the second part has a linear uneven edge or saw-tooth-shaped edge in the second region.

18. The arrayed waveguide grating of claim 12, wherein the first part has a height of about 220 nm, and
the second part has a height that is less by about 10 nm to about 50 nm than that of the first part.

\* \* \* \* \*